(12) United States Patent
Hansen, Sr.

(10) Patent No.: US 9,010,992 B2
(45) Date of Patent: Apr. 21, 2015

(54) MIXING APPARATUS FOR FROZEN PRODUCTS

(75) Inventor: Asbjorn Rudolf Hansen, Sr., Drammen (NO)

(73) Assignee: Marienlyst Eiendom AS, Drammen (NO)

( * ) Notice: Subject to any disclaimer, the term of this patent is extended or adjusted under 35 U.S.C. 154(b) by 0 days.

(21) Appl. No.: 13/223,878

(22) Filed: Sep. 1, 2011

(65) Prior Publication Data
US 2013/0058184 A1    Mar. 7, 2013

(51) Int. Cl.
| B01F 7/00 | (2006.01) |
| A23G 9/22 | (2006.01) |
| A23G 9/28 | (2006.01) |
| A23G 9/30 | (2006.01) |

(52) U.S. Cl.
CPC .. *A23G 9/22* (2013.01); *A23G 9/28* (2013.01); *A23G 9/30* (2013.01)

(58) Field of Classification Search
CPC ..................... A47J 43/044; A47J 2043/04463; B01F 7/1605
USPC ......... 366/194, 197, 242, 244, 245, 247, 249, 366/250, 318, 286; 251/88, 303, 292, 557
See application file for complete search history.

(56) References Cited

U.S. PATENT DOCUMENTS

| 1,497,255 | A | * | 6/1924 | Woods ........................ 222/185.1 |
| 1,965,905 | A | * | 7/1934 | Parker ............................ 366/194 |
| 2,816,518 | A | | 12/1957 | Daggett |
| 3,323,320 | A | * | 6/1967 | Conz ................................ 62/303 |
| 4,123,176 | A | * | 10/1978 | Barker ........................... 366/213 |
| 4,502,377 | A | * | 3/1985 | Hall, Jr. ......................... 366/318 |
| 4,647,214 | A | * | 3/1987 | Kibby ............................ 366/212 |
| 5,129,434 | A | * | 7/1992 | Whigham et al. ............. 141/362 |
| 6,318,889 | B1 | | 11/2001 | Hansen, Sr. |
| 6,341,887 | B1 | * | 1/2002 | Hansen, Sr. ................... 366/138 |
| 7,165,787 | B1 | | 1/2007 | Go |
| 7,503,687 | B2 | * | 3/2009 | Heinhold et al. ............. 366/197 |
| 2004/0141411 | A1 | * | 7/2004 | Huang ........................... 366/204 |
| 2006/0102016 | A1 | * | 5/2006 | Ulrich et al. ..................... 99/452 |
| 2007/0297282 | A1 | * | 12/2007 | Procuranti ..................... 366/255 |

OTHER PUBLICATIONS

International Search Report and Written Opinion Issued in International Application No. PCT/EP2012/066218, Dated Mar. 15, 2013 (9 Pages).

* cited by examiner

*Primary Examiner* — Tony G Soohoo
*Assistant Examiner* — Anshu Bhatia
(74) *Attorney, Agent, or Firm* — Osha Liang LLP

(57) ABSTRACT

An apparatus for mixing frozen desserts has a mixing chamber, and a spindle with driving portion for rotating the spindle. The mixing chamber has two main parts having a funnel and a top chamber forming a closed mixing chamber when brought together. The spindle is accommodated through the top chamber.

8 Claims, 4 Drawing Sheets

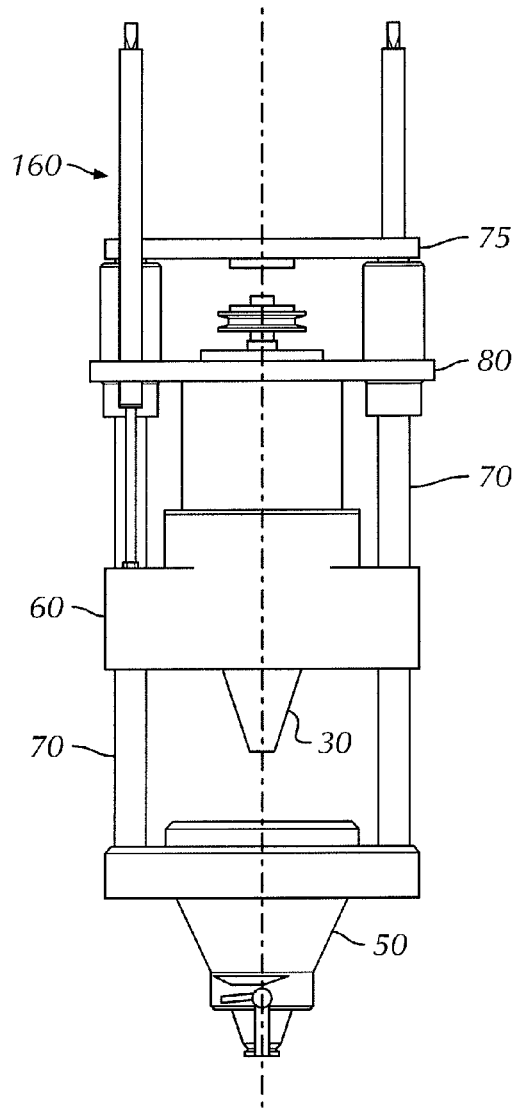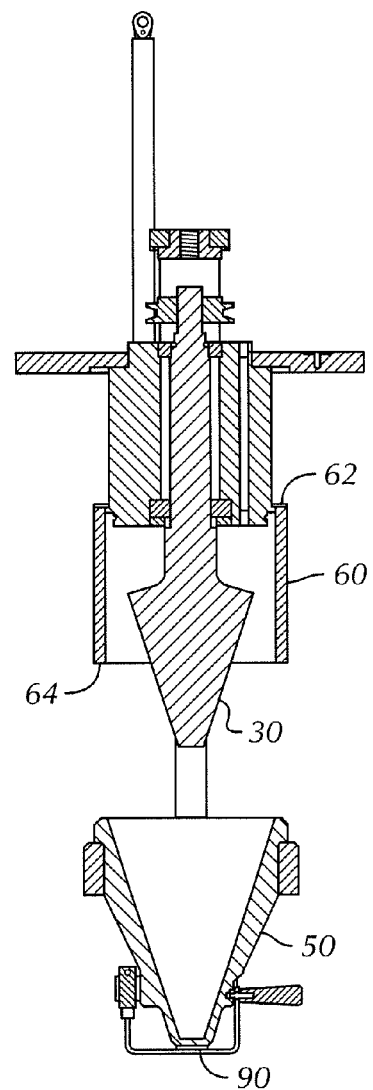
*FIG. 3A*    *FIG. 3B*

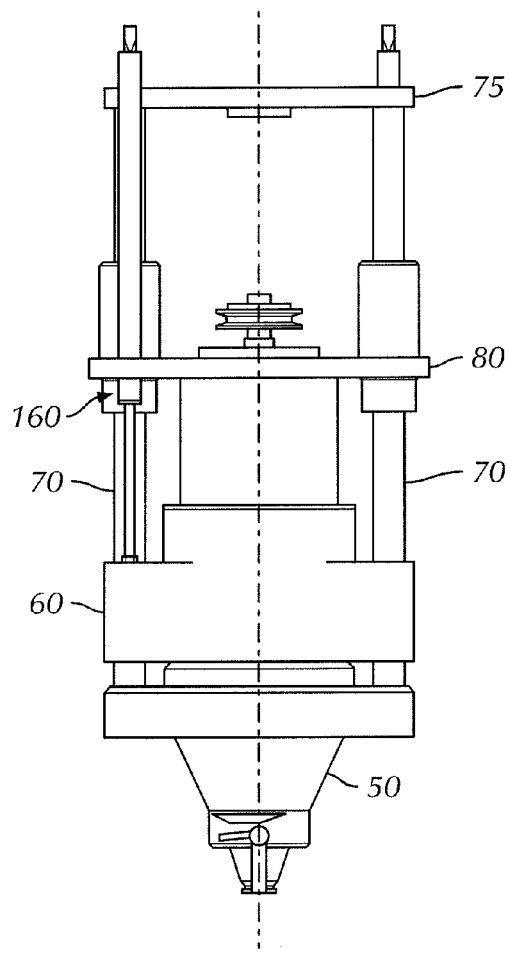
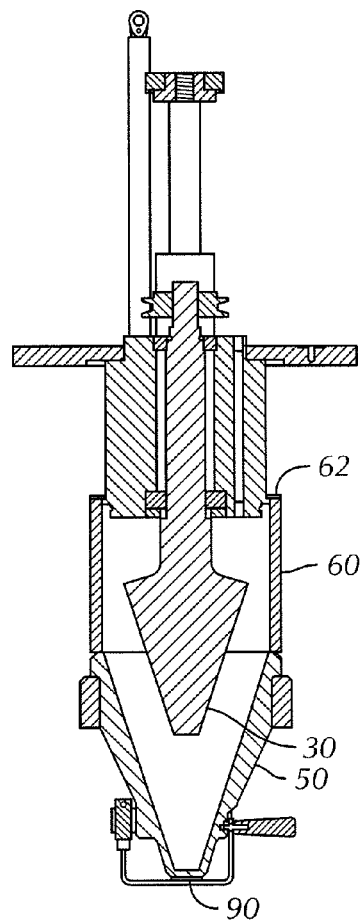
FIG. 4A                               FIG. 4B

MIXING APPARATUS FOR FROZEN PRODUCTS

FIELD OF THE INVENTION

The present invention describes details of an apparatus for mixing and blending ice cream and other frozen desserts. More specifically the invention describes details of a two part mixing chamber of a blending apparatus.

BACKGROUND OF THE INVENTION

A mixing apparatus for mixing ice cream and other frozen desserts with one or more additives typically comprises a funnel for holding the frozen dessert and additives, an auger with a spindle for creating a mixing action, an auger driver for rotating the auger spindle, and a linear actuator for relative movement of the funnel and auger into a position in which the auger is telescoped into the funnel, in which position a rotation of the auger will mix the different ingredients of the frozen dessert. The following disclosure relate to a mixing apparatus for making ice cream. The apparatus described is however well suited for mixing other types of desserts.

Ice cream is normally in hard form, while flavor additives may be fruits or nuts. The result of such a mixing is a semi-liquid ice cream in which the flavor additives are more or less distributed before being dispensed from the mixing apparatus.

Such apparatuses are known from a number of patents, e.g. U.S. Pat. No. 6,341,887 and U.S. Pat. No. 6,318,889 describe apparatuses comprising an auger or agitator with a helical thread or cutter extending into a funnel or container for holding the ice cream and additives. The auger and funnel are relatively rotatable, and after some rotation the ice cream and additives have obtained a desired semi-liquid condition.

SUMMARY

An issue with the apparatuses known from prior art is maintenance and cleaning. Due to the construction of the mixing chamber made in one closed piece, maintenance and cleaning of the chamber is cumbersome and can not be performed efficiently.

One or more embodiments of the present invention provides an improved mixing apparatus with regards to easy maintenance and cleaning of the parts in contact with the substance to be mixed.

One or more embodiments of the present invention presents a mixing apparatus that facilitate easy maintenance and cleaning.

One or more embodiments of the present invention provides an improved mixing apparatus for providing easy maintenance and cleaning.

An apparatus for mixing frozen desserts according to one or more embodiments of the present invention comprises at least a mixing chamber and a spindle with driving means for rotating said spindle, and where the mixing chamber is made up of two main parts comprising a funnel and a top chamber forming a closed mixing chamber when brought together, and where said spindle is accommodated through the top chamber.

It should be understood that the detailed description and specific examples, while indicating embodiments of the invention are given by way of illustration only, since various changes and modifications within the spirit and scope of the invention will become apparent to those skilled in the art.

BRIEF DESCRIPTION OF THE DRAWINGS

FIG. 3A is a front view of details of the mixing apparatus according to one or more embodiments of the present invention where the funnel is separated from the top chamber;

FIG. 3B is a cross section of details of the mixing apparatus according to one or more embodiments of the present invention where the funnel is separated from the top chamber;

FIG. 4A is a front view of details of the mixing apparatus according to one or more embodiments of the present invention where the funnel is moved up and is in contact with the top chamber;

FIG. 4B is a cross section of details of the mixing apparatus according to one or more embodiments of the present invention where the funnel is moved up and is in contact with the top chamber;

DETAILED DESCRIPTION

Embodiments of the invention will be described below with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
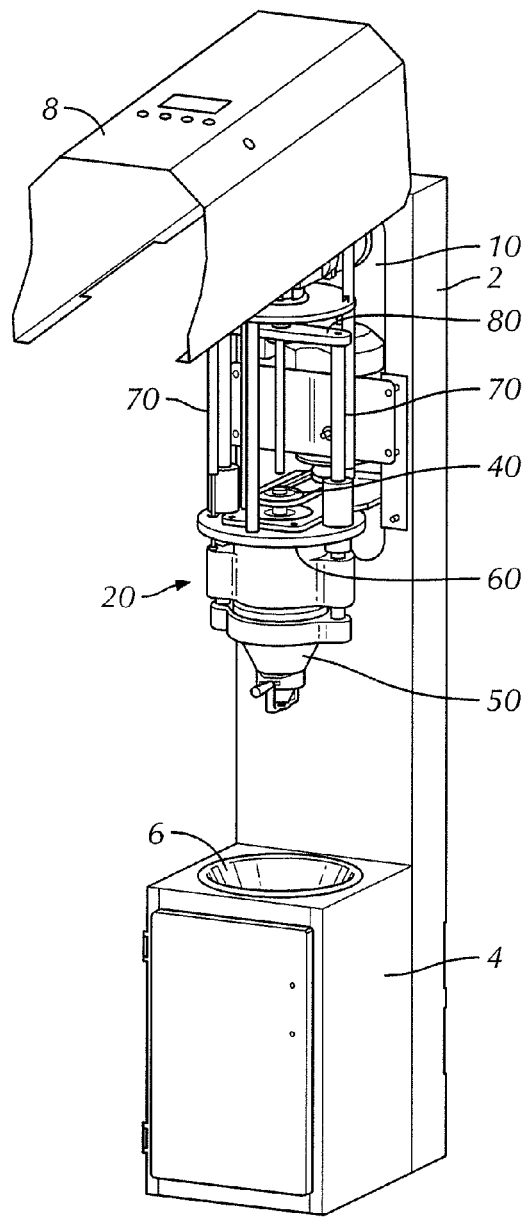
FIG. 1 shows a complete and ready to use set-up of the mixing apparatus according to one or more embodiments of the present invention.

FIG. 1 shows a complete mounted and ready to use set-up of the mixing apparatus 10 for frozen desserts according to one or more embodiments of the present invention. The figure shows the apparatus 10 for mixing frozen desserts mounted on a rack 2. When in use, the mixing apparatus 10 is protected by a lid 8 (shown in a lifted position). The figure further shows a cabinet 4 with a sink 6 located below the mixing apparatus 10. The sink is used when performing a cleaning operation of the mixing apparatus 10.

According to one or more embodiments of the present invention, the mixing apparatus 10 comprises at least a mixing chamber 20 and a spindle 30 with driving means 40 for rotating the spindle 30. The spindle has the shape of a conical screw. The mixing chamber is where the frozen dessert, e.g. ice cream and flavor additives, is held and mixed.

The mixing chamber 20 is made up of two main parts comprising a funnel 50 and a top chamber 60 forming a closed mixing chamber 20 when brought together. The spindle 30 is accommodated through the top chamber 60.

The mixing apparatus 10 has a self contained washing system comprising water heater, containers for detergent and disinfectant, dosing units, and a device for controlling rinsing and washing procedure, i.e. controlling temperature, supply of detergent and disinfectant.

Figure 2:
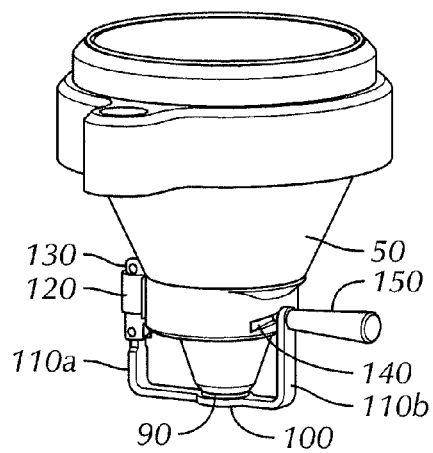
FIG. 2 shows the funnel and details of the valve connected to the funnel according to one or more embodiments of the present invention.

FIG. 2 shows the funnel 50 and details of the valve 90 connected to the funnel 50. The funnel 50 comprises a valve 90 having a valve assembly with a closure element comprising a flat plate element 100 with first and second upwardly bent arms 110a, 110b, where the first arm 110a is realizably hinged 120 to the lower part of the funnel 50 around a rotating axis positioned spaced apart from the centre axis of the funnel 50, and where the second arm 110b has a pin protruding into an angled slit 140 in the lower part of the funnel 50, wherein the opening and closing of the valve 90 is carried out by a turning movement of the plate element 100 around said rotating axis. The figure further shows that an operating lever 150 is connected to the second arm 110b of the valve assembly.

When the valve 90 is open, i.e. the pin protruding into the angled slit 140 is in the lower position of the slit 140, the flat plate element 100 is located on the side of the outlet of the valve 90. When the valve 90 is closed, i.e. the pin protruding into the angled slit 140 is in the upper position of the slit 140, the flat plate element 100 is forced against the opening of the outlet of the funnel 50, thus sealing and closing the valve 90.

The design of the valve 90 is advantageous with regards to maintaining high hygiene and easy cleaning. It is easy to clean the parts in contact with the frozen dessert, i.e. the valve 90, the flat plate element 100 and the funnel 50. By removing the cotter pin 130, the flat plate element 100 can be easily removed from the funnel 50 to be cleaned.

FIGS. 3A and 3B shows respectively a front view and a cross section view of details of the mixing apparatus 10 where the funnel 50 is separated from the top chamber 60. The top chamber 60 comprises an inner part and an outer part, where the outer part is a sleeve glidably connected to the inner part which is stationary.

The outer part is pushed down and held in a lower position relative to the inner part by means of at least one gas spring 160.

The figures show that the mixing apparatus 10 further comprises two vertical guiding elements 70. In the lower ends, the guiding elements 70 are attached to the funnel 50. The guiding elements 70 are further running through guiding holes in the outer part of the top chamber 60. In the upper ends the guiding elements 70 are attached to a lifting system 75 connected to a motor for driving and guiding said funnel 50 in an upward direction to make contact with said outer part of the top chamber 60 thereby forming the closed mixing chamber 20. This will provide a precise linear lifting movement of the funnel towards the top chamber 60.

The spindle 30 is connected to a motor driving the spindle. The shaft at the spindle runs through the top chamber 60. When the mixing chamber 20 is closed, mixing of frozen desserts can start.

FIGS. 4A and 4B shows respectively a front view and a cross section view of details of the mixing apparatus 10 where the funnel 50 is moved up and is in contact with the outer part of the top chamber 60. In this position the mixing chamber is closed, and a mixing operation can start. The funnel 50 and the outer part of the top chamber 60 is provided with sealing means for ensuring tight fitting between said two parts.

An example of sealing means is spring elements provided in top chamber and gasket 64 and stop ring 62 for providing tight closure between the funnel 50 and the top chamber 60 when brought together. The stop ring 62 is for preventing the outer part of the top chamber 60 to extend beyond the lower end of the inner part of the top chamber 60 when the outer part is pushed down in a lower position relative to the inner part by the gas spring 160.

Figure 5A:
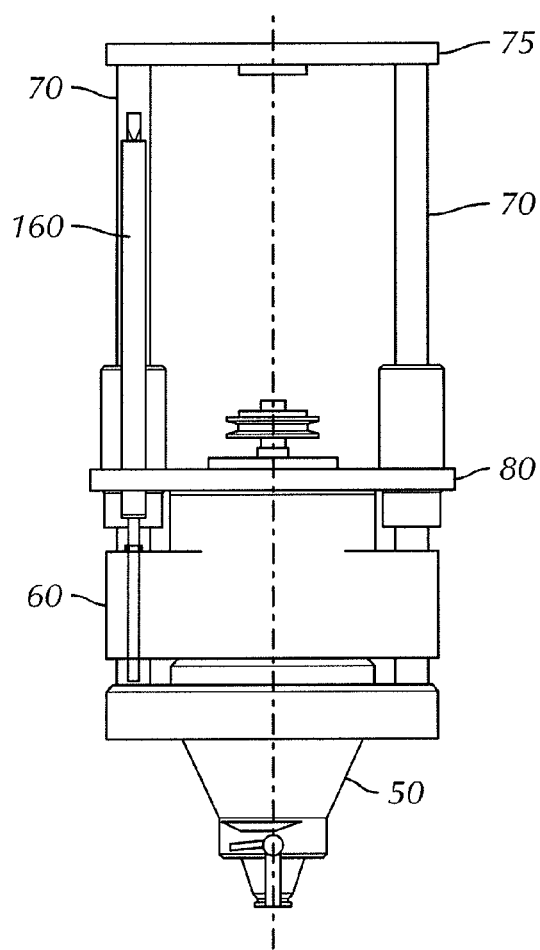
FIG. 5A is a front view corresponding to FIG. 4A, and where the spindle is fully within the funnel.
Figure 5B:
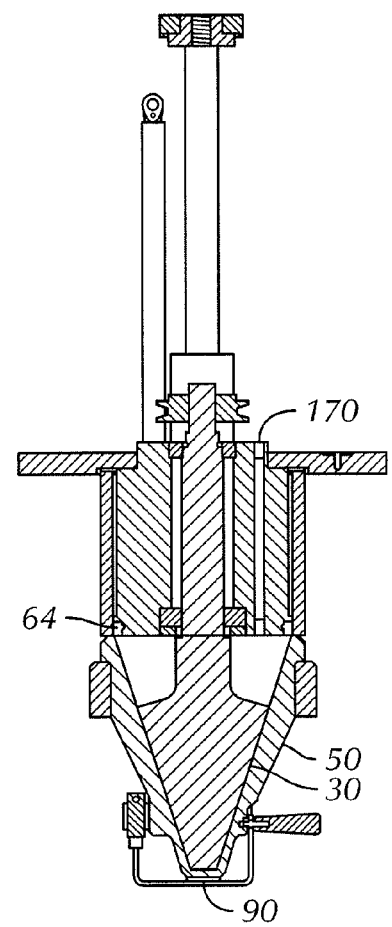
FIG. 5B is a side view corresponding to FIG. 4B, and where the spindle is fully within the funnel.

FIGS. 5A and 5B shows respectively a front view and a cross section view corresponding to FIGS. 4A and 4B where the spindle 30 is fully within the funnel 50. The outer part of the top chamber 60 is driven to an upper position relative to the inner part.

The mixing apparatus 10 further comprises water heater, detergent dosing unit and water spray nozzles for pointing a water spray at the spindle 30 for washing purposes. The water spray nozzles according to one or more embodiments of the present invention are mounted in the top chamber 60. Inlet 170 in for water and detergent in the top chamber 60 is also indicated in FIG. 5B.

In one embodiment, the apparatus 10 further comprises programmable control means enabled for being remotely operated and programmed.

The mixing apparatus 10 also includes electric circuitry with programmable control unit, a power supply, switches, pushbuttons and lamps (not shown in figures). The electronic control unit may include microelectronics for both manual and automatic activation of the linear actuator, switches, lamps, motors and control valves. The automatic activation can be based on input from sensors or a timer and include sequencing of functions.

When operating the mixing apparatus 10, an operator puts a charge of frozen dessert, e.g. ice cream, typically hard ice cream, and a charge of flavor additive, typically fruit, berries or nuts into the funnel 50 with the valve 90 closed. The operator then pushes a button which activates a motor for driving and guiding the funnel 50 in an upward direction guided by the guiding elements 70 to make contact with the outer part of the top chamber 60 thereby forming the closed mixing chamber 20. The spindle 30 will stand still as long as the funnel 50 and top chamber 60 are separated. Only when the mixing chamber is closed the driving means 40 for the spindle 30 is activated and start rotating. Once the funnel 50 and top chamber 60 are brought together, they are moved together in the upward direction thereby inserting the spindle 30 completely into the funnel. The force exerted by the gas spring 160 ensures that there will be a tight fitting between the funnel 50 and the outer part of the top chamber 60 before the funnel 50 is further driven upwards such that the outer part of the top chamber glides in an upward movement on the inner part of the top chamber 60. This action and movement will cause the spindle to be lowered into the funnel 50 while the mixing chamber is kept tight. The ice cream and flavor additives are mixed into a semi-liquid mixture. After a certain time, e.g. 5 seconds the ready mixture is poured out for consumption through the valve 90 after opening this by operating the operating lever 150.

After finishing the mixing and pouring out the mixture, the operator may select to initiate a cleaning operation by pushing a button, or pushing another button for separating the funnel 50 from the top chamber 60 thereby enabling said operating procedure to be repeated. The separation is performed by activating the motor for driving and guiding the funnel 50 in a downward direction thus separating the funnel 50 from the top chamber 60, where the outer part of the top chamber 60 is held back on the inner part by a stop ring 62 before separation.

The outlet from the valve 90 may have different shaped orifices attached, which may have the shape of e.g. a star, giving the ice cream mixture a desired shape.

A man skilled in the art will recognize that the invention described above can be varied in many ways. Such variations are not to be regarded as a departure from the spirit and scope of the invention, and all such modifications are intended to be included within the scope of the following claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An apparatus for mixing frozen desserts comprising:
a mixing chamber; and
a spindle with a driving portion that rotates said spindle,
wherein the mixing chamber comprises two main parts comprising a funnel and a top chamber forming a closed mixing chamber when brought together,
wherein a screw portion of said spindle is accommodated through the top chamber and extends into the funnel when a mixing operation is performed, and
wherein water spray nozzles are mounted in the top chamber.

2. The apparatus according to claim 1,
wherein the top chamber comprises an inner part and an outer part,
wherein the outer part is a sleeve glidably connected to the inner part which is stationary, and
wherein the outer part is pushed down and held in a lower position relative to the inner part by at least one gas spring.

3. The apparatus according to claim 1, further comprising:
at least two vertical guiding elements connected to the funnel, and running through guiding holes in the outer part of the top chamber, and
a motor for driving and guiding said funnel in an upward direction to make contact with said stationary top chamber thereby forming the closed mixing chamber.

4. The apparatus according to claim 1,
wherein the funnel further comprises a valve having a valve assembly with a closure element comprising a flat plate element with first and second upwardly bent arms,
wherein the first arm is releaseably hinged to the lower part of the funnel around a rotating axis positioned spaced apart from the centre axis of the funnel, and
wherein the second arm has a pin protruding into an angled slit in the lower part of the funnel, wherein the opening and closing of the valve is carried out by a turning movement of the plate element around said rotating axis.

5. The apparatus according to claim 4, wherein an operating lever is connected to said second arm of the valve assembly.

6. The apparatus according to claim 1, wherein the apparatus further comprises a water heater, a detergent dosing unit.

7. The apparatus according to claim 1, wherein the apparatus further comprises a programmable control unit enabled for being remotely operated and programmed.

8. The apparatus according to claim 2, further comprising:
at least two vertical guiding elements connected to the funnel, and running through guiding holes in the outer part of the top chamber, and
a motor for driving and guiding said funnel in an upward direction to make contact with said stationary top chamber thereby forming the closed mixing chamber.

* * * * *